(12) United States Patent
Yokoyama et al.

(10) Patent No.: US 7,437,072 B2
(45) Date of Patent: Oct. 14, 2008

(54) OPTICAL CROSS-CONNECT WITH PATH SELECTING FUNCTION

(75) Inventors: Hiroyuki Yokoyama, Saitama (JP); Hajime Nakamura, Saitama (JP)

(73) Assignee: KDDI Corporation, Tokyo (JP)

( * ) Notice: Subject to any disclaimer, the term of this patent is extended or adjusted under 35 U.S.C. 154(b) by 952 days.

(21) Appl. No.: 10/378,889

(22) Filed: Mar. 5, 2003

(65) Prior Publication Data

US 2004/0037557 A1   Feb. 26, 2004

(30) Foreign Application Priority Data

Mar. 8, 2002   (JP)   ............... 2002-063450

(51) Int. Cl.
*H04B 10/00*   (2006.01)
(52) U.S. Cl. .................................. 398/57; 398/50
(58) Field of Classification Search ............... 398/50–57
See application file for complete search history.

(56) References Cited

U.S. PATENT DOCUMENTS 6,807,179 B1 *  10/2004  Kanuri et al. ......... 370/395.31
7,024,113 B2 *   4/2006  Miyabe ................... 398/51
7,050,718 B2 *   5/2006  Rychlicki .............. 398/57
2002/0109879 A1 *  8/2002  Wing So ................ 359/118
2002/0178268 A1 * 11/2002  Aiken et al. ............ 709/228
2003/0074443 A1 *  4/2003  Melaku et al. .......... 709/224
2003/0147645 A1 *  8/2003  Imajuku et al. .......... 398/7
2005/0220006 A1 * 10/2005  Kumano et al. ......... 370/216

FOREIGN PATENT DOCUMENTS

JP   62-250791   10/1987
JP   2001-333045  11/2001

* cited by examiner

*Primary Examiner*—Leslie Pascal
(74) *Attorney, Agent, or Firm*—Oblon, Spivak, McClelland, Maier & Neustadt, P.C.

(57) ABSTRACT

An optical cross-connect for selecting a path between an access-line connected to a router and a trunk-line connected to another optical cross-connect the optical cross-connect has a hash-table H for randomly specifying a trunk-line number k as elements $h(i,j)=k$ in the order of selection j for every access-line number i; and a path selection means for selecting a path of trunk-line number k with a busy flag that has been reset, in the order of selection j by using the hash-table H when a path addition to an access-line number i is requested, the path selection means setting the busy flags of all elements h that specify the selected trunk-line number k in the hash-table H.

5 Claims, 3 Drawing Sheets

OPTICAL CROSS-CONNECT WITH PATH SELECTING FUNCTION

FIELD OF THE INVENTION

The present invention relates to an optical cross-connect with path selecting function. In particular, the present invention relates to an optical cross-connect with WDM (Wavelength Division Multiplexing) function for switching an extremely large number of paths.

DESCRIPTION OF THE RELATED ART

With an increase of IP (Internet Protocol) traffic in the Internet, the need for an IP backbone network using optical cross-connects has intensified. Each optical cross-connect in such backbone network is desired to have functions for dynamically adding and deleting a path depending on an IP traffic applied to the optical cross-connect. Therefore, required has been a technique for dynamically adding or deleting a path (WDM wavelength path) in trunk-lines between optical cross-connects depending on change in traffic with respect to time so as to improve a quality of service and a resource availability.

FIG. 1 illustrates a sequence between optical cross-connects for independently and asynchronously (autonomous distributed) adding or deleting a path in their trunk-lines.

As shown in FIG. 1, the optical cross-connect is connected with a router through access-lines, and connected with another cross-connect through the trunk-lines. Between the cross-connects, a path is added or deleted without using a signaling sequence. A packet transmitted from the source router is received by the destination router through the source optical cross-connect and the destination optical cross-connect.

Usually, a single initial path (transmission channel) is initially set up between the optical cross-connects for the source router and the destination router. The initial path is always fixedly assigned.

When traffic in the initial path increases, both of the optical cross-connects independently and asynchronously determine whether a path should be added into the trunk-lines or not. When the traffic exceeds a capacity of the initial path, a path namely an additional path is added.

Addition and deletion of the additional path are triggered by a change of the traffic load. By thus controlling the number of paths between the routers, it is possible to control communication traffic between the routers and also to control burst traffic.

The traffic is transmitted to the initial path prior to the additional paths. When the initial path is filled up, the earlier added additional path is used for traffic transmission. After that, when the earlier added additional path is also used up, the latter added additional path is used. Thereby, when at least one path is added, it is possible to determine whether a further path should be added or not by measuring only traffic in the last added path.

When the traffic between a source router and a destination router decreases, both of the source optical cross-connect and the destination optical cross-connect independently and asynchronously delete an additional path.

It is required that both of the source optical cross-connect and the destination optical cross-connect should select the same trunk-line for the successful path addition or deletion.

Due to a little time difference and a control error, a path selected by both of the optical cross-connects may differ from each other. For example, when two requests of path addition may simultaneously occur in both of the optical cross-connects, two distinct trunk lines between both of the optical cross-connects might be selected. In such case, one optical cross-connect may select a first trunk-line for a first access-line and then select a second trunk-line for a second access-line, whereas the other optical cross-connect may select the first trunk-line for the second access-line and then select the second trunk-line for the first access-line. In this case, it is impossible to communicate normally. Then the amount of traffic flowing to the lines will decrease and the path will be deleted by the path deletion mechanism mentioned above.

SUMMARY OF THE INVENTION

It is therefore an object of the present invention to provide an optical cross-connect with path selecting function for preventing that different trunk-lines are selected for each access-line in source optical cross-connect and destination optical cross-connect when these optical cross-connects add or delete a trunk-line independently and asynchronously for each other.

The present invention concerns an optical cross-connect for selecting a connection between an access-line and a trunk-line connected to the optical cross-connect. In particular, according to the present invention, the optical cross-connect has a hash-table H for randomly specifying a trunk-line number k as elements $h(i,j)=k$ in the order of selection j for every access-line number i; and a path selection means for selecting a path of trunk-line number k with a busy flag that has been reset, in the order of selection j by using the hash-table H when a path addition to an access-line number i is requested, the path selection means setting the busy flags of all elements h that specify the selected trunk-line number k in the hash-table H.

It is preferred that the path selection means resets the busy flags of all elements h that specify a trunk-line number k added lastly for the access-line number i, in the hash-table H, when a path deletion for the access-line number i is requested.

It is also preferred that the optical cross-connect further has means for measuring a traffic of the access-line, and means for determining an addition or deletion for the path of trunk-line based on the measured traffic and for sending the determined result to the path selection means.

DESCRIPTION OF THE PREFERRED EMBODIMENTS

Figure 1:
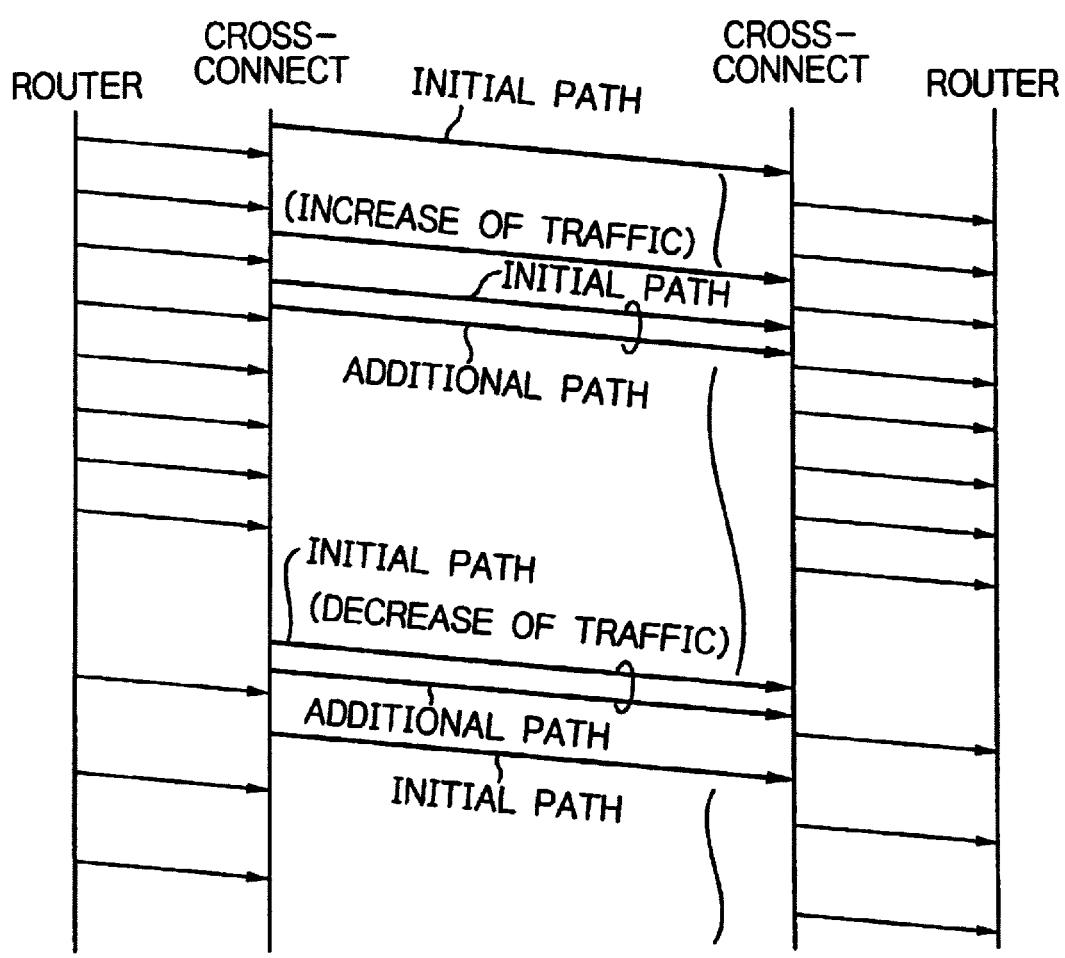
FIG. 1, already described, illustrates a sequence between optical cross-connects for independently and asynchronous adding and deleting a path of trunk-line.
Figure 2:
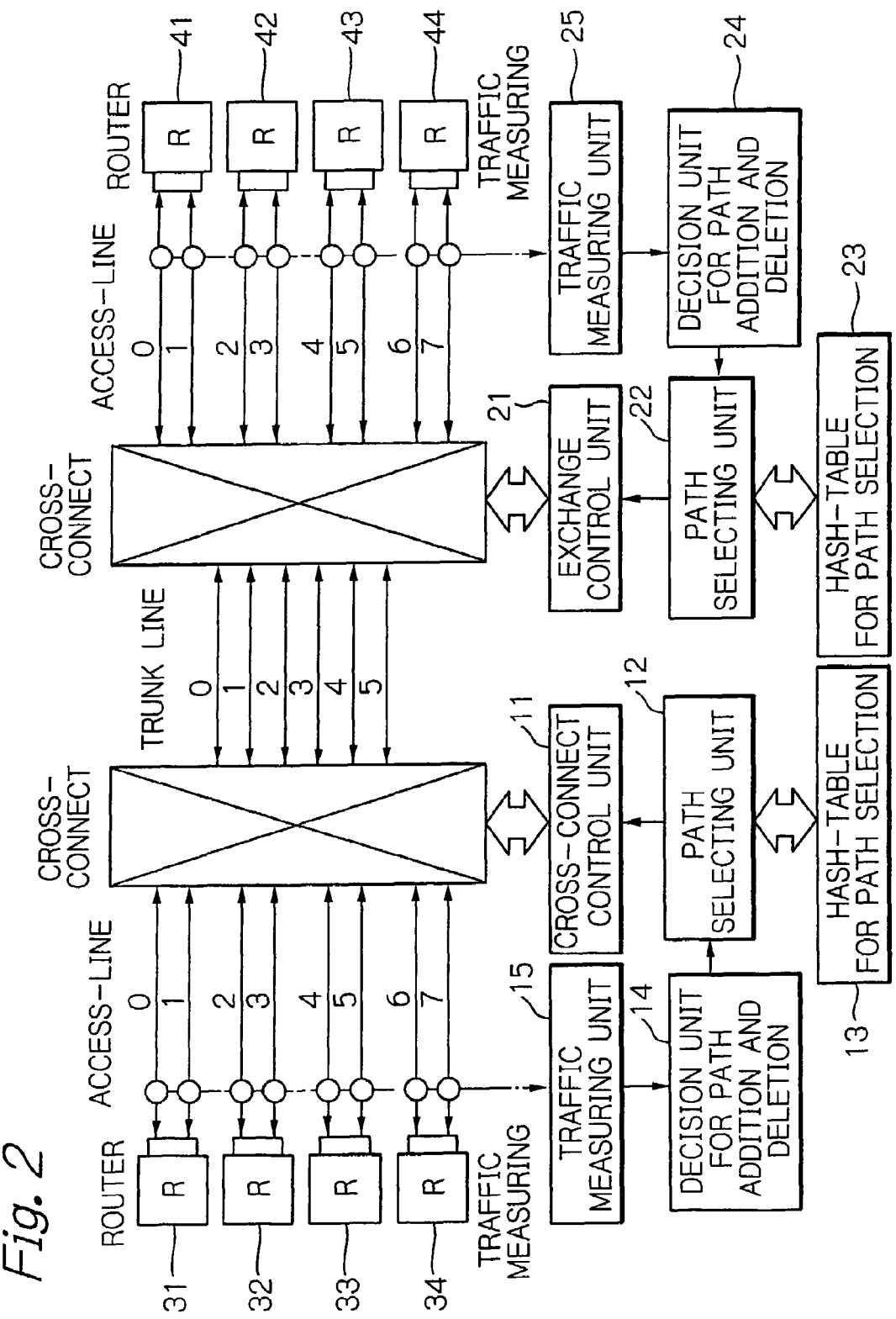
FIG. 2 illustrates a system configuration of an optical cross-connect according to the present invention.

FIG. 2 illustrates a system configuration of an optical cross-connect according to the present invention.

As shown in the figure, the optical cross-connect 1 has a cross-connect control unit 11, a path selecting unit 12, a hash-table H 13 for path selection, a decision unit 14 for deciding the additional and deletion path, and a traffic measuring unit 15. The cross-connect control unit 11 controls the optical cross-connect 10 to add the path selected by the selecting unit 12. The selecting unit 12 uses the hash table H 13, and selects an additional path according to the request of the path addition or deletion from the decision unit 14. The decision unit 14 requires an addition or deletion of a path depending on the results of the traffic measuring unit 15. The traffic measuring unit 15 measures an input and output traffic in access-lines of routers 31-34. These units may be implemented constituted as an all in one optical cross-connect.

Following Table 1 is the hash-table H according to the present invention.

TABLE 1

| HASH-TABLE FOR PATH SELECTION | CHOICE OF TRUNK-LINE | | | | | | BUSY TRUNK-LINE NUMBER |
|---|---|---|---|---|---|---|---|
| | 1st | 2nd | 3rd | 4th | 5th | 6th | |
| ACCESS-LINE NUMBER 0 | 2 | 0 | 4 | 5 | 3 | 1 | |
| 1 | 2 | 3 | 5 | 1 | 4 | 0 | |
| 2 | 5 | 4 | 2 | 0 | 1 | 3 | |
| 3 | 5 | 0 | 1 | 4 | 2 | 3 | |
| 4 | 2 | 4 | 0 | 3 | 5 | 1 | |
| 5 | 4 | 1 | 5 | 2 | 0 | 3 | |
| 6 | 1 | 0 | 5 | 4 | 3 | 2 | |
| 7 | 4 | 2 | 5 | 3 | 0 | 1 | |

As shown in Table 1, rows show access-line number i, and columns show trunk-line number $h(i,j)=k$ specified to be order of selection j. The $h(i,j)$ also records a flag for indicating the whether the trunk-line number k is busy.

The hash-table H describes the order of selection in trunk-line for every access-line. That is, the candidates of trunk-line number is arranged at random in the order of selection j for every access-line number i.

As shown Table 1, for access-line number 0, trunk-line numbers 2, 0, 4, 5, 3 and 1 are specified in the order of selection. In such case, when a line of trunk-line number 2 is busy, a line of trunk-line number 0 is used. The busy flags in each element of Table 1 can be set and reset according to the state of the corresponding trunk-line. Therefore, if the flag in the corresponding element is set, the corresponding trunk-line number is busy, whereas if the flag in the corresponding element is reset, the corresponding trunk-line number is unassigned.

In the hash-table H, it is important that the trunk-line number in the order of path selection has no correlation between the different access-lines. Therefore, it is preferred to determine the series of trunk-line number by using random numbers. Another important point is that both two optical cross-connects should use the same hash-table H.

Figure 3A:
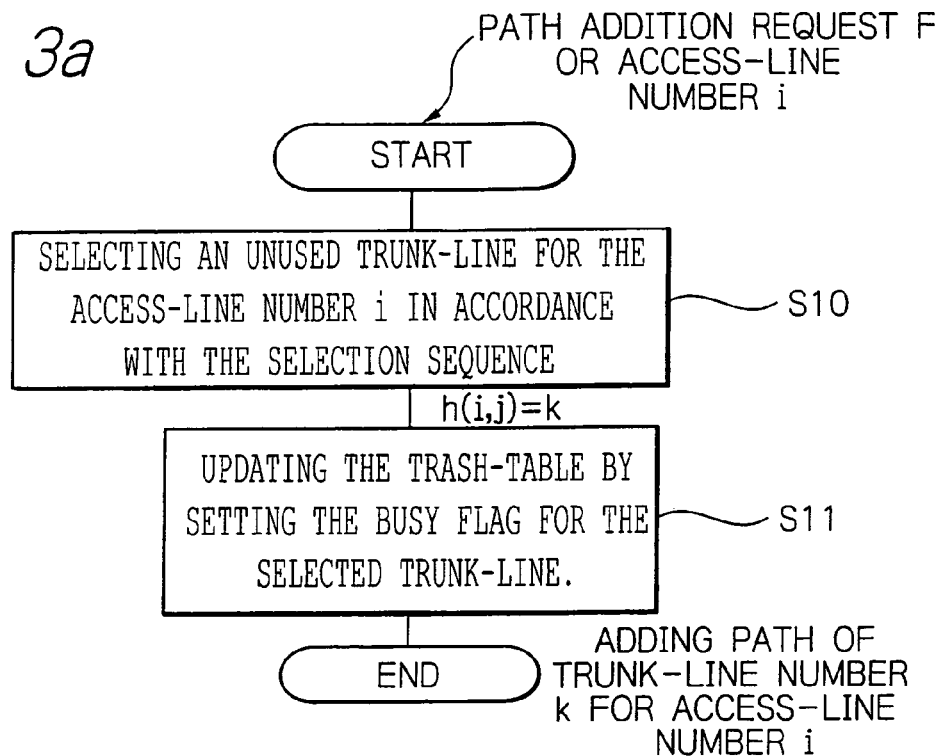
FIG. 3a shows a flow chart when a path addition request occurs in access-line number i.

FIG. 3a shows a flow chart when a path addition request occurs in access-line number i.

(S10) For the access-line number i, unassigned trunk-line number $k=h(i,j)$ that the flag is reset is searched in the order of selection j.

(S11) When unassigned trunk-line number k is found, the flags of all elements in the hash-table H for the trunk-line number k are set.

Then, trunk-line number k is assigned to access-line i.

For example, when a path addition request is generated in the access-line number 0, an unassigned trunk-line is searched in ascending order of selection for the access-line number 0. In first order, unassigned trunk-line number 2 will be found, and the flags of all elements for specifying the trunk-line number 2 are set in whole hash-table H. Then, the trunk-line number 2 will be assigned to the access-line number 0.

Subsequently, when a path addition request is generated in the access-line number 2, an unassigned trunk-line is searched in ascending order of selection for the access-line number 2. In first order, unassigned trunk-line number 5 will be found, and the flags of all elements for specifying the trunk-line number 5 are set in whole hash-table H. Then, the trunk-line number 5 will be assigned to the access-line number 2.

Furthermore, when a path addition request generates to the access-line number 4, an unassigned trunk-line is searched in the ascending order of selection for the access-line number 4. In first order, since the flag of the trunk-line number 2 is set, the trunk-line number 2 has been busy. In following order, unassigned trunk-line number 4 will be found, and the flags of all elements for specifying the trunk-line number 4 are set in whole hash-table H. Then, the trunk-line number 4 will be assigned to the access-line number 4.

After the above mentioned sequence, the busy flags of the hash-table H are changed as shown in Table 2.

TABLE 2

| HASH-TABLE FOR PATH SELECTION | CHOICE OF TRUNK-LINE | | | | | | BUSY TRUNK-LINE NUMBER |
|---|---|---|---|---|---|---|---|
| | 1st | 2nd | 3rd | 4th | 5th | 6th | |
| ACCESS-LINE NUMBER 0 | 2 | 0 | 4 | 5 | 3 | 1 | 2 |
| 1 | 2 | 3 | 5 | 1 | 4 | 0 | |
| 2 | 5 | 4 | 2 | 0 | 1 | 3 | 5 |
| 3 | 5 | 0 | 1 | 4 | 2 | 3 | |
| 4 | 2 | 4 | 0 | 3 | 5 | 1 | 4 |
| 5 | 4 | 1 | 5 | 2 | 0 | 3 | |
| 6 | 1 | 0 | 5 | 4 | 3 | 2 | |
| 7 | 4 | 2 | 5 | 3 | 0 | 1 | |

As shown in the Table 2, it will be understood that the access-line numbers 0, 2 and 4 are assigned to the trunk-lines 2, 5 and 4, respectively.

Subsequently, when a path addition request is generated in the access-line number 6, an unassigned trunk-line is searched in ascending order of selection for the line corresponding to the access-line number 6. In first order, the unassigned trunk-line number 1 will be found, and the flags of all elements for specifying the trunk-line number 1 are set in whole hash-table H. Then, the trunk-line number 1 will be assigned to the access-line number 6.

The busy flags of the hash-table H are changed as shown in Table 3.

TABLE 3

| HASH-TABLE FOR PATH SELECTION | CHOICE OF TRUNK-LINE | | | | | | BUSY TRUNK-LINE NUMBER |
|---|---|---|---|---|---|---|---|
| | 1st | 2nd | 3rd | 4th | 5th | 6th | |
| ACCESS-LINE NUMBER 0 | 2 | 0 | 4 | 5 | 3 | 1 | 2 |
| 1 | 2 | 3 | 5 | 1 | 4 | 0 | |
| 2 | 5 | 4 | 2 | 0 | 1 | 3 | 5 |
| 3 | 5 | 0 | 1 | 4 | 2 | 3 | |
| 4 | 2 | 4 | 0 | 3 | 5 | 1 | 4 |
| 5 | 4 | 1 | 5 | 2 | 0 | 3 | |
| 6 | 1 | 0 | 5 | 4 | 3 | 2 | 1 |
| 7 | 4 | 2 | 5 | 3 | 0 | 1 | |

As shown in Table 3, i t will be understood that the access-line numbers 0, 2, 4 and 6 are assigned to trunk-lines 2, 5, 4 and 1, respectively.

Furthermore, when a path addition request Is generated to access-line number 1, an unassigned trunk-line is searched in ascending order of selection for the line corresponding to the access-line number 1. In first order, since the flag of the trunk-line number 2 is set, the trunk-line number 2 has been busy. In following order, unassigned trunk-line number 3 will be found, and the flags of all elements for specifying the trunk-line number 3 are set in whole hash-table H. Then, the trunk-line number 3 will be assigned to the access-line number 1.

The busy flags of the hash-table H are changed as shown in Table 4.

TABLE 4

| HASH-TABLE FOR PATH SELECTION | | CHOICE OF TRUNK-LINE | | | | | | BUSY TRUNK-LINE NUMBER |
|---|---|---|---|---|---|---|---|---|
| | | 1st | 2nd | 3rd | 4th | 5th | 6th | |
| ACCESS-LINE NUMBER | 0 | 2 | 0 | 4 | 5 | 3 | 1 | 2 |
| | 1 | 2 | 3 | 5 | 1 | 4 | 0 | 3 |
| | 2 | 5 | 4 | 2 | 0 | 1 | 3 | 5 |
| | 3 | 5 | 0 | 1 | 4 | 2 | 3 | |
| | 4 | 2 | 4 | 0 | 3 | 5 | 1 | 4 |
| | 5 | 4 | 1 | 5 | 2 | 0 | 3 | |
| | 6 | 1 | 0 | 5 | 4 | 3 | 2 | 1 |
| | 7 | 4 | 2 | 5 | 3 | 0 | 1 | |

As show in T able 4, it will be understood that the access-line numbers 0, 1, 2, 4 and 6 are assigned trunk-lines 2, 3, 5, 4 and 1, respectively. In the above process, we implicitly assume that both source and destination optical cross-connects receive the requests of path additions and deletions in the same order. Consider that the path addition request of the access-line number 1 and the path addition request of the access-line number 6 are interchanged within a very short time in destination optical cross-connect. Even In such case, the selected trunk-line numbers does not change. This is because the first candidates of the trunk-line for the access-lines number 1 and 6 are the trunk-lines number 3 and 1, respectively as shown in Table 2. This property is very preferable for such an asynchronous distributed control system that a timing of a path addition request may differ between the optical cross-connects.

Figure 3B:
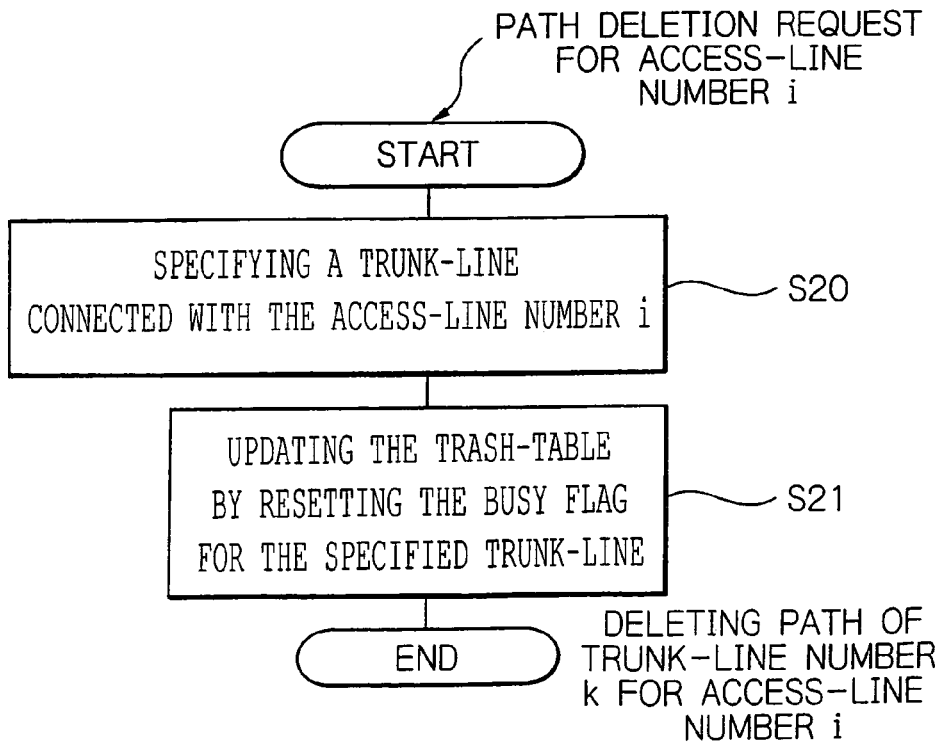
FIG. 3b shows a flow chart when a path deletion request is generated by access-line number i.

FIG. 3b shows a flow chart when a path deletion request is generated in access-line number 1.

(S20) For access-line number i, a last added trunk-line number k is specified.

(S21) For whole hash-table H, the flags of all elements h for specifying trunk-line number k are reset.

For example, in Table 4, when a path deletion request is generated in the access-line 0, the flags of all elements for specifying the trunk-line number 2 are reset in whole hash-table H. Then, the trunk-line number 2 assigned to the access-line 0 is deleted.

According to the present invention, it is possible to prevent that different trunk-lines are selected for each access-line in source optical cross-connect and destination optical cross-connect when these optical cross-connects add or delete a trunk-line independently and asynchronously for each other.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical cross-connect configured to connect via access-lines to routers and via trunk-lines to a remote optical cross-connect, said optical cross-connect comprising:
   a hash table means indicating selection sequences and used trunk-lines, each selection sequence specifying an order of trunk-lines to the remote optical cross-connect for an access-line; and
   selection means for independently selecting an unused trunk-line from the remote optical cross-connect for an unused access-line in accordance with a selection sequence in the hash table means when a path addition is requested for the unused access-line.

2. The optical cross-connect according to claim 1, wherein the order of trunk-lines in each selection sequence is selected at random.

3. The optical cross-connect according to claim 2, wherein said selection means updates used trunk-lines in the hash table means, when the path addition or a path deletion is requested for any of the access-lines.

4. The optical cross-connect according to claim 3, wherein said optical cross-connect further comprises:
   means for measuring a traffic of each access-line; and
   means for determining a path addition or deletion for each access-line based on the measured traffic, and for sending the determined result to said selection means.

5. The optical cross-connect according to claim 1, wherein the hash table means. specifies the access-line assigned to a used trunk-line.

* * * * *